United States Patent [19]

Adams

[11] Patent Number: 4,722,551

[45] Date of Patent: Feb. 2, 1988

[54] INITIATOR AND METHOD FOR THE INCORPORATION THEREOF IN AN INFLATOR

[75] Inventor: Gary V. Adams, Perry, Utah

[73] Assignee: Morton Thiokol, Inc., Chicago, Ill.

[21] Appl. No.: 27,917

[22] Filed: Mar. 19, 1987

[51] Int. Cl.⁴ .................... B60R 21/00; B60R 21/26
[52] U.S. Cl. .................................... 280/736; 280/731
[58] Field of Search ............... 280/731, 732, 734, 736; 180/282; 422/166

[56] References Cited

U.S. PATENT DOCUMENTS

| | | | |
|---|---|---|---|
| 3,944,251 | 3/1976 | Lynch | 280/731 |
| 4,117,271 | 9/1979 | Bell et al. | 280/731 |
| 4,394,033 | 7/1983 | Goetz et al. | 280/736 |
| 4,561,675 | 12/1985 | Adams et al. | 280/736 |

*Primary Examiner*—Richard Bertsch
*Attorney, Agent, or Firm*—Gerald K. White

[57] ABSTRACT

An inflator for a protective air bag is arranged for initiation by an ignition squib assembly that is adapted to be incorporated in the inflator housing structure after assembly thereof with the inflator pyrotechnics contained therein. The ignition squib assembly includes a sleeve having a circular crimp on a first end region thereof with a collar on the sleeve in tight embracing relation with that region. Igniting materials including an electrical squib and ferrite beads are potted in the sleeve. The sleeve and attached collar are pressed in a hole in the wall of the housing structure defining the inflator ignition chamber with a second end region of the sleeve extending into the ignition chamber and an inner end of the collar abutting an O-ring in the hole to provide a seal. A lip on the hole is rolled over the collar to prevent the ignition squib assembly from being pulled out of the hole.

9 Claims, 3 Drawing Figures

INITIATOR AND METHOD FOR THE INCORPORATION THEREOF IN AN INFLATOR

BACKGROUND OF THE INVENTION

1. Field of the Invention

The present invention relates to a gas generator or inflator that utilizes the combustion of a solid fuel gas generant composition for the generation of a gas for rapidly inflating a vehicle passive restraint inflatable crash protection bag, and more particularly, to the assembly in such an inflator of an ignition squib or initiator.

2. Description of the Prior Art

A variety of gas generators or inflators that utilize combustible solid fuel gas generant compositions for the inflation of an inflatable crash protection or "air bag" restraint system are known in the prior art. Typical forms of such inflators utilizing ignition squibs for the initiation thereof are disclosed in the following U.S. patents:

| U.S. Pat. No. | Issue Date | Patentee |
|---|---|---|
| 3,951,428 | April 20, 1976 | Fumio Sigura et al. |
| 3,986,456 | Oct. 19, 1976 | Bernard J. Doin et al. |
| 4,116,466 | Sept. 26, 1978 | Robert G. Gehrig |
| 4,131,299 | Dec. 26, 1978 | Koichi Ono et al. |
| 4,249,673 | Feb. 10, 1981 | Masayoshi Katoh et al. |
| 4,278,638 | July 14, 1981 | Karl E. Nilsson et al. |
| 4,296,084 | Oct. 20, 1981 | Gary V. Adams et al. |
| 4,547,342 | Oct. 15, 1985 | Gary V. Adams et al. |
| 4,561,675 | Dec. 31, 1985 | Gary V. Adams et al. |

Gas generators or inflators must withstand enormous thermal and mechanical stresses for a short period during the gas generation process. As a result, inflators have been fabricated using steel for the casing and other housing structural components, with the structural components being joined together by screw threads, roll crimping or welding, and with the initiator or ignition squib assembled prior to joining the structural components in some cases, and after, in others. Where the initiator is assembled after joining of the structural components, it has been the practice to screw the initiator into a tap hole in the external steel casing, as disclosed, for example, in the aforementioned U.S. Pat. Nos. 3,951,428; 3,986,456; 4,249,673 and 4,131,299.

Emphasis on weight reduction in automobiles has created a need for lighter weight crash bag inflation systems. This is of particular importance in a system for driver crash bag protection where the inflator is mounted on the steering wheel. Specifically, the availability of a lighter weight inflator enables a reduction to be made in the weight of the steering wheel and steering column on which the inflator is mounted.

It has been determined that the most significant weight reductions in the inflator can be achieved by the substitution of aluminum for the steel casing and other housing structural components, aluminum already being used internally in the inflator as containers, seals and filter media. Such light weight inflators in which aluminum has been substituted for steel in the casing and other structural components are disclosed in the above-mentioned Adams et al. U.S. Pat. Nos. 4,547,342 and 4,561,675. The inflator of each of these patents includes first and second aluminum structural components. The first component, a diffuser shell having outlet ports, includes three integrally formed concentric cylinders which define chambers containing ignition materials, a solid gas generant composition and filters and provide ports for the passage of generated gases from chamber to chamber and then through outer ports. The second component, a base shell, includes an ignition squib or initiator captured therein and is provided with three concentric surfaces that mate with the ends of the concentric cylinders of the first component. The three concentric cylinders of the diffuser shell component are simultaneously joined with the base shell initiating surfaces of the second component by a single inertia welding operation.

While the manner of assembly and performance of the captured ignition squib or initiator in the aluminum inflator of each of U.S. Pat. Nos. 4,547,342 and 4,561,675 are satisfactory, there are problems in respect of complexity, space required to capture and lock the ignition squib in place, and a requirement for the assembly of the ignition squib in the inflator before the diffuser shell and base shell components are welded together.

The use of a tap hole having an internal screw thread in the aluminum base shell of the inflator for enabling the ignition squib to be assembled after the welding operation and assembly of the pyrotechnics also presents a problem. This is for the reason that while such a tap hole is satisfactory for use in a steel casing, it is not satisfactory for use in an aluminum base shell as employed in the inflator of U.S. Pat. Nos. 4,547,342 and 4,561,675. A tap hole in such an aluminum base shell would require a much larger thread than that suitable for steel casings in order to carry the load, and hence, a correspondingly larger space to lock the ignition squib in place.

Thus, there exists a need and a demand for improvement in the method of and apparatus used to incorporate the ignition squib in the casing or housing of a gas generator or inflator after the structural components thereof have been joined together and the inflator pyrotechnics have been assembled therein. There is a particular need and demand for facilitating the assembly of the ignition squib in the base shell of an aluminum inflator, as above described, after the welding operation and assembly therein of the inflator pyrotechnics.

SUMMARY OF THE INVENTION

An object of the invention is to provide an improved method for incorporating an initiator in the casing or housing structure of an inflator after assembly of the housing structure with the inflator pyrotechnics contained therein.

Another object of the invention is to provide an improved inflator for inflating a protective air bag wherein the housing structure is made of aluminum and the initiator is incorporated in the housing structure after assembly thereof and the inclusion therein of the inflator pyrotechnics by a process including the steps of:
(a) forming a hole in the wall of the inflator ignition chamber with the hole having a first inner shoulder and an external lip;
(b) placing an O-ring in the hole in engaging relationship with the inner shoulder;
(c) forming an initiator for press fit insertion into the hole by:
  1. placing a collar having an inner end and an outer end on a first end portion of a sleeve, the sleeve also having a second end portion and having a circular crimp on the first end portion, the collar having an inner shoulder adjacent said outer end thereof against which the end of the sleeve adjacent the first end portion is positioned in abutting relation;

2. expanding the sleeve into the collar to effect a tight attachment of the collar on the sleeve;

3. placing igniting materials including an electric squib having a pair of energizing terminals in the sleeve; and 4. potting the igniting materials in the sleeve with the energizing terminals of the electric squib extending outwardly from the end of the first end portion of the sleeve;

(d) incorporating in the housing structure of the inflator the initiator so formed in accordance with step (c) by:

1. pressing the sleeve and collar in the hole in the wall of the inflator ignition chamber with the inner end of the collar bearing against the O-ring therein thereby to effect a seal for the ignition chamber; and 2. rolling the external lip of the hole over the outer end of the collar to prevent the collar and sleeve from being pulled out of said hole.

A further object of the invention is to provide an improved ignition squib assembly having particular utility for incorporation as the inititor in the base shell of an aluminum inflator after the pyrotechnics thereof have been assembled therein.

In accomplishing these and other objectives of the invention there is provided an ignition squib assembly comprising a steel plated cylindrical sleeve and an associated stainless steel collar that is placed in close encircling relation with one end of the sleeve. Adjacent that end of the sleeve but suitably spaced therefrom is a circular crimp or ridge that is formed on the sleeve. In order to fixedly attach the collar to the sleeve in a tight embracing manner, the sleeve is expanded into the collar by any suitable means, as for example, by an expanding mandrel, as is known in the art.

When the collar has been fixedly attached to the sleeve, an igniting squib with attached electrical leads is inserted in the sleeve together with suitable igniting materials, ferrite beads, etc. and is potted therein with a suitable potting compound with the electrical leads extending from the end of the sleeve on which the circular crimp is formed.

This ignition squib assembly is positioned in press fit relation in a centrally located hole having an O-ring therein in the aluminum base shell of an inflator which also includes an aluminum diffuser shell, as previously described herein. The O-ring is held in place in the hole between an inner shoulder therein and the inner end of the collar and forms a seal thereat when the ignition squib assembly is pressed into the hole.

A plurality of angularly spaced longitudinal ridges on the cylindrical sleeve of the ignition squib assembly serve to guide the assembly as it is pressed into the inflator aluminum base shell hole. At least three and preferably four such longitudinal ridges spaced at substantially equal angles from each other are provided. These ridges also serve to hold the ferrite beads in place in the cylindrical sleeve.

In order to prevent the ignition squib assembly from being pulled out of the hole in the inflator base shell, an overlapping portion or lip of the latter is rolled over the outer end of the collar.

The various features of novelty which characterize the invention are pointed out with particularity in the claims annexed to and forming a part of the specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this description of the invention, a detailed description follows with reference being made to the accompanying figures of drawing which form part of the specification, in which like parts are designated by the same reference numbers, and of which.

DESCRIPTION OF THE PREFERRED EMBODIMENT

Figure 1:
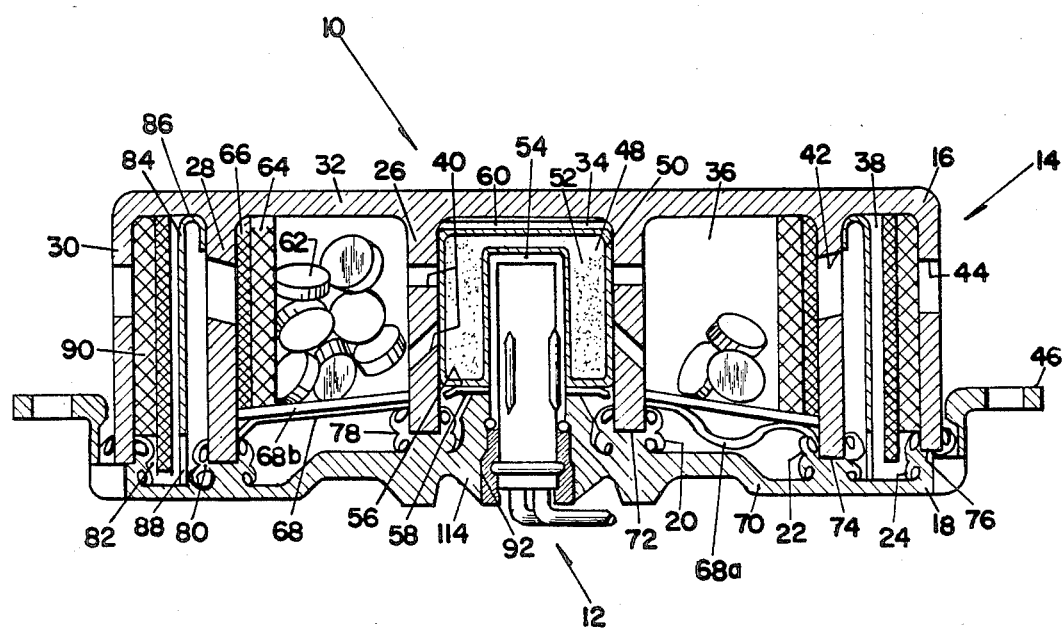
FIG. 1 is a sectional view of a gas generator or inflator for a crash protection air bag system embodying the ignition squib assembly according to the present invention.

In FIG. 1 of the drawings the initiator or ignition squib assembly according to the invention is shown embodied in an inflator assembly that is generally indicated by reference numeral 10. The initiator or ignition squib assembly is designated by numeral 12.

The inflator assembly 10, in plan view, has a generally cylindrical external outline and includes a housing construction 14 comprising two structural components. The two structural components, as shown in FIG. 1, comprise an upper shell or diffuser 16 and a lower shell or base 18, which shells are joined by three concentric inertia welds at 20, 22 and 24 to form the housing construction 14 of the inflator assembly 10. The three inertia welds 20, 22 and 24 are performed simultaneously in a single inertia welding operation.

The diffuser 16 is formed by forging three concentric cylinders 26, 28 and 30, each of which cylinders extend downwardly from a common flat upper wall 32 of the diffuser 16 to form a separate weld interface with the base 18. The inner cylinder 26, in cooperation with wall 32 and base 18 forms a cylindrical igniter chamber 34. The intermediate cylinder 28, in cooperation with the inner cylinder 26, wall 32, and base 18, forms an inner chamber having the shape of a toroid, specifically a combustion chamber 36. The outer cylinder 30, in cooperation with the intermediate cylinder 28, wall 32 and base 18, forms an outer filter chamber 38 that also has the shape of a toroid. Cylinders 26, 28 and 30 each include a plurality of uniformly spaced exhaust openings or ports 40, 42 and 44, respectively, through which the generated or inflation gas flows into a protective air bag (not shown) to be filled. The base 18 includes an interface attachment flange 46 which is used to attach the inflator assembly 10 to a vehicle the occupants of which are to be protected.

Positioned within the igniter chamber 34 is an igniter charge assembly 48 comprising a rupturable closed aluminum container 50 containing igniting material 52. Container 52 may be hermetically sealed against moisture, has a recess or cavity 54 formed in the bottom 56 thereof, and is retained in igniter chamber 34 by a retaining ring 58. Retaining ring 58 has a shape conforming to the bottom 56 of container 52 including recess 54 and may be inserted in the end of chamber 34 in press fit relation therewith. At the top end thereof, container 50 is held in spaced relation with the inner surface of wall 32 by cushion/spacer material 60 which desirably may comprise a cerafiber material.

Although various pyrotechnic materials may be employed for igniter material 52, a preferred material is a granular mixture of 25% by weight of boron and 75% of potassium nitrate. This mixture has been found to burn with a very hot flame that is suitable for igniting the solid fuel gas generant material employed in the inflator assembly 10, as described hereinafter.

Contained within the toroidal combustion chamber 36 of the inflator assembly 10 are uniformly distributed pellets 62 of a gas generant composition which may be any one of a number of compositions meeting the requirements of burning rate, nontoxicity, and flame temperature. One composition that may be utilized is that described in U.S. Pat. No. 4,203,787 granted to George F. Kirchoff et al. Another composition that may advantageously be utilized is that described in U.S. Pat. No. 4,369,079 granted to Graham C. Shaw.

Pellets 62 are surrounded by an annular inner screen pack or combustion chamber filter 64. Screen pack 64 may desirably include a layer 66 of coarse screen adjacent to the inner surface of concentric cylinder 28. An aluminum washer-shaped retaining ring or disk 68 holds the gas generant pellets 62 and screen pack 64 in place and away from the base 18 which, during the inertia welding operation, is rotating.

As shown in FIG. 1, the internal surface of the base 18 includes a circular rounded ridge 70. This ridge 70 serves to reduce the free volume of combustion chamber 36. Additionally, during functioning of the inflator assembly 10, ridge 70 provides support for the retaining ring or disk 68. To that end several dimples may be provided on disk 68, one dimple 68a only being shown in the drawing. The dimples 68a rest on ridge 70. A soft or sponge-like pad 68b made of cerafiber may be provided between the disk 68 and the pellets 62 for holding the latter in place.

The concentric interface regions of base 18 that mate with the three concentric cylinders 26, 28 and 30 comprise short concentric-like stubs 72, 74 and 76, respectively. During the formation of the inertia welds 20, 22 and 24, flashing indicated respectively at 78, 80 and 82 is formed around the ends of the concentric cylinders 26, 28 and 30.

In the outer toroidal or filter chamber 38, an aluminum deflector ring 84 is provided. Deflector ring 84 is formed with an inwardly directed curved flange 86 at its upper end and has a plurality of uniformly spaced exhaust openings or ports 88 adjacent the bottom thereof. Ring 84 has a length at least as long as concentric cylinder 28 and is positioned in embracing relation with the latter with flange 86 in press fit engagement with the outer surface of cylinder 28 at the inner end thereof and engaging weld flashing 80 at the outer end thereof. Also included in the toroidal filter chamber 38 is an outer screen pack or filter 90.

As shown in FIG. 1, the ignition squib assembly 12 extends through a centrally located hole 92 in the lower shell of base 18 of inflator assembly 10 into the recess 54 of the rupturable container 50. The ignition squib assembly 12 is characterized by its ease of assembly and is advantageous in that it need not be brought into cooperative relationship with the inflator assembly 10 until after the welding of the diffuser shell 16 and the base shell 18 has been completed with the assembly therein of the inflator pyrotechnics. The ignition squib assembly 12 is further characterized in that no potting material is required to seal it to the inflator assembly 10. Additionally, less space is required to lock the ignition squib 12 in place.

Figure 2:
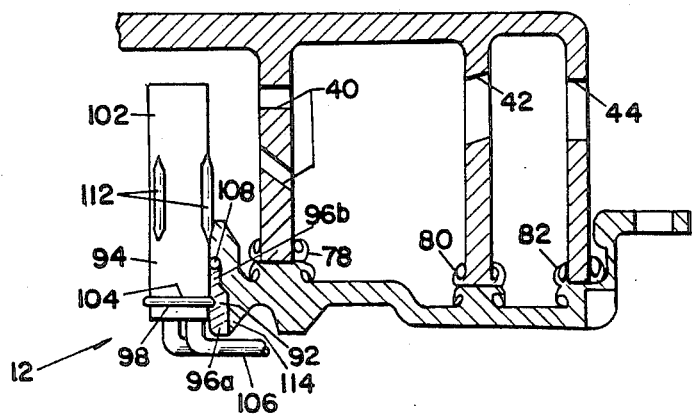
FIG. 2 is a sectional view illustrating the sleeve and collar assembly of the ignition squib assembly.
Figure 3:
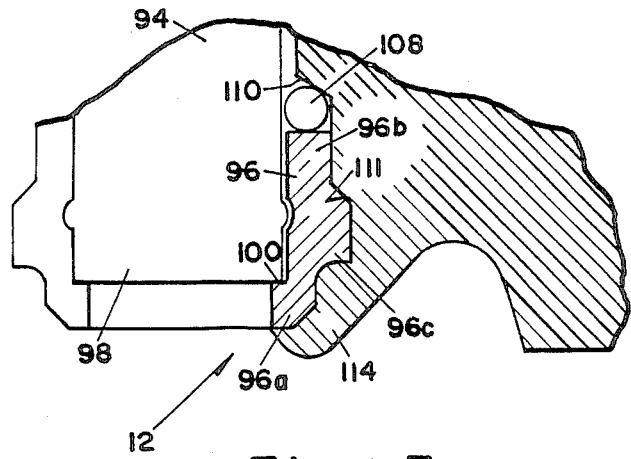
FIG. 3 is a detailed view illustrating the crimp configuration of the ignition squib assembly.

Specifically, the ignition squib assembly 12, as best seen in FIGS. 2 and 3, includes a steel plated cylindrical sleeve 94 and an associated stainless steel collar 96. Collar 96 has a first or outer end 96a and a second or inner end 96b and also includes an external shoulder 96c. Collar 96 is positioned in close encircling relation with a first end portion, designated 98, of sleeve 94, with the extreme end of end portion 98 being flat or planar and in abutting relationship with a mating flat or planar inner shoulder 100 in collar 96. The other or second end portion 102 of sleeve 94 is adapted to be inserted in recess 54 of container 50 when the ignition squib assembly 12 is brought into operative relationship with the inflator assembly 10. A circular crimp or ridge 104 is formed on sleeve 94 spaced a short distance, as shown, from the end 98 thereof. For attaching the collar 96 to the sleeve 94 in a tight embracing manner, the sleeve 94 is expanded into the collar 96 with the crimp 104 placed at an intermediate position relatively to the ends of the collar 96. Such expansion may be effected in any suitable manner, as for example, by the use of an expanding mandrel. Suitable explosive or other metal forming means may be employed, if desired.

The crimp 104 may be designed to withstand a pull-out force of 100 pounds minimum and a torque force of 25 inch/pounds minimum without collar 96 rotating on sleeve 94.

With the collar 96 tightly attached to the sleeve 94, igniting materials including a conventional electric squib (not shown) having a pair of energizing electrical terminals or lead wires 106 are placed in the sleeve 94 together with the customary ferrite beads and are potted therein using suitable potting material with the lead wires 106 extending from the end 98 of sleeve 94.

The ignition squib 12 assembled in this manner is press fit in the centrally located hole 92 in the base shell 18 of the inflator assembly 10 with an O-ring 108, which may be made of an elastomeric material, placed between a first inner shoulder 110 in hole 92 and the inner end 96b of collar 96. The O-ring 108 forms a seal for the igniter chamber 34 when the ignition squib assembly 12 is pressed in place. The hole 92 also includes a second inner shoulder 111 against which the external shoulder 96c of collar 96 is then in abutting relation.

At least three and preferably four substantially straight longitudinal ridges 112 on the sleeve 94 serve to guide the ignition squib assembly 12 as it is pressed in place in the hole 92 against the O-ring 108. To that end the longitudinal ridges 112 are equally spaced around the circumference of the sleeve 94. In addition to serving as a guide means for the ignition squib assembly 12 as the latter is inserted in hole 92, the longitudinal ridges 112 also serve to hold the ferrite beads in place in the sleeve 94.

For preventing the ignition squib assembly 12 from being pulled out of the hole 92 after being pressed therein, the rim or lip 114 of hole 92 in base 18 is flared, and rolled over the end 116 of collar 96 thereby capturing the external shoulder 96c of collar 96 between the second shoulder 111 in hole 92 and the lip 114.

In accordance with the invention, the inflator 10 is welded in the wholly loaded condition except for the assembly therewith of the ignition-squib assembly 12. During the inertia welding operation, the assembly of the loaded diffuser shell 16 containing the igniter material 52, gas generant pellets 62, inner screen pack 64, retaining ring 68, deflector ring 84, and outer screen pack 90 is held stationary in the inertia welding machine. The aluminum retaining ring 68 holds the gas generant pellets 62 and the inner screen pack 64 in place and also serves to keep them separated from the spinning base shell 18 during the inertia welding process.

In the inertia welding process, the base shell 18 is rotated beneath the loaded diffuser shell 16 by power driven clutch means (not shown) to a speed, typically of about 3,000 r.p.m. Upon the attainment of such speed, the clutch is actuated to disconnect the power source and the freely spinning base 18 is raised upward to bring the concentric stubs 72, 74 and 76 into contact with the lower end of a respectively associated one of the three concentric cylinders 26, 28 and 30 of the diffuser shell 16. The resulting friction stops the spinning of the base 18 in a fraction of a second but raises the temperature at the areas of contact sufficiently to cause consolidation thereat of the metal of the diffuser shell 16 and base shell 18. Pressure is maintained for a short period, for example, a second or two, to allow the welds 20, 22 and 24 to solidify.

During the welding process, flashing 78, 80 and 82 is created at the interface of the ends of the respective cylinders 26, 28 and 30 and the stubs 72, 74 and 76 of the base 18. For improving the structural integrity of the welded assembly, the weld interface is raised or stubbed away from the inner surface of base 18. The weld flashing 78 from the inner cylinder 26 and the weld flashing 80 from the intermediate cylinder 28 are utilized to retain the aluminum ring or disk 68 in place.

The housing construction 14 provides a structure for containing the high pressure inflation gases which are produced by combustion of the gas generant pellets 62. Functioning of the inflator assembly 10 begins with an electrical signal from a crash sensor (not shown) to the ignition squib assembly 12 by way of the electrical leads 106. The squib assembly 12 fires into and pierces the closed aluminum container 50 that holds the igniter material 52. The igniter material 52 burns and bursts through the walls of the container 50 and through the exit openings 40 in the inner cylinder 26 and into the toroidal combustion chamber 36. The hot igniter gases ignite the gas generant pellets 62 which release the nitrogen inflator gases. These gases flow through the inner screen filter pack 64 and radially outward through the combustion chamber exit openings 42. The screen filter pack 64 serves to cool the inflator gases and to remove particulate residue therefrom. As the exhaust gases flow through the combustion chamber openings 42, they are turned downward by the deflector ring 84 where they strike the flashing 80 from the intermediate cylinder inertia weld 22. The flashing serves to interrupt the exhaust gas flow which helps to remove additional particulate matter from the gases. The gases then flow radially outward through the openings 88 in the deflector ring 84 and outer screen pack 90, through the latter, and finally through the exit openings or ports 44 of the diffuser shell 16. The outer screen pack 90 serves to further cool the exhaust gases and remove particulate matter therefrom.

Thus, there has been provided, in accordance with the invention, an improved method for assembling an initiator in the housing structure of an inflator for inflating a protective air bag after the structural components of the inflator have been joined together and the inflator pyrotechnics have been assembled therein. There has also been provided an improved ignition squib assembly that is particularly useful for assembly as the initiator in the base shell of an aluminum inflator after the inflator structural components comprising the base shell and an aluminum diffuser shell have been welded together with all of the inflator pyrotechnics contained therein.

The arrangement is characterized in that no potting material is required to seal the ignition squib assembly to the inflator housing structure. Also, less space is required to lock the ignition squib assembly in place.

With this detailed description of the invention, those skilled in the art will appreciate that modifications may be made to the invention without departing from its spirit. Therefore, it is not intended that the scope of the invention be limited to the specific embodiment illustrated and described. Rather, it is intended that the scope of this invention be determined by the appended claims and their equivalents.

What is claimed is:

1. A method for incorporating an initiator in the housing structure of an inflator having an ignition chamber after assembly of the housing structure with the inflator pyrotechnics contained therein comprising the steps of:
    (a) forming a hole in the wall of said inflator ignition chamber with said hole having a first inner shoulder and an external lip;
    (b) placing an O-ring in said hole in engaging relationship with said inner shoulder;
    (c) forming an initiator for press fit insertion into said hole by:
        (1) placing a collar having an inner end and an outer end on a first end portion of a sleeve, said sleeve also having a second end portion and having a circular crimp on said first end portion, said collar having an inner shoulder adjacent said outer end thereof against which the end of said sleeve adjacent said first end portion is positioned in abutting relation;
        (2) expanding said sleeve into said collar to effect a tight attachment of said collar on said sleeve;
        (3) placing igniting materials including an electric squib having a pair of energizing terminals in said sleeve; and
        (4) potting said igniting materials in said sleeve with the said energizing terminals of said electric squib extending outwardly from the end of said first end portion of said sleeve;
    (d) incorporating in the housing structure of the inflator said initiator so formed in accordance with step (c) by:
        (1) pressing said sleeve and collar in said hole in the wall of said inflator ignition chamber with the inner end of said collar bearing against said O-ring therein thereby to effect a seal for said ignition chamber; and
        (2) rolling the external lip of said hole over the outer end of said collar to prevent said collar and sleeve from being pulled out of said hole.

2. A method as defined by claim 1 including the further step in the formation of said hole in the wall of the inflator ignition chamber of forming a second inner shoulder therein positioned between said lip and said first inner shoulder; and including the further step in the formation of said initiator for press fit insertion into said hole of forming said collar with an external shoulder adjacent said outer end thereof;

whereby when said lip is rolled over said collar said external shoulder of said collar is captured between said lip and said second inner shoulder of said hole.

3. A method as defined by claim 2 including the further step in the formation of said initiator of forming said sleeve with at least three substantially straight longitudinal ridges that are substantially equally angularly spaced about the peripheral surface thereof for guiding said sleeve and collar as they are being pressed in said hole, said ridges being located at a central region along the length of said sleeve between the second end of said collar and the second end portion of said sleeve.

4. An ignition squib assembly comprising, a sleeve having a first end and a second end and including a circular crimp adjacent said first end, the extreme end of said first end of said sleeve being planar, and a collar having a planar inner shoulder adjacent one end thereof, said collar being held in tight embracing relationship with said first end at least of said sleeve including said crimp with the planar end of said first end of said sleeve in abutting relation with said planar inner shoulder of said collar, said sleeve having igniting materials therein including an electrical squib having electrical terminals that extend outwardly of said sleeve from said first end thereof, said igniting materials being potted in said sleeve with a suitable potting material.

5. An igniting squib assembly as defined by claim 4 wherein said collar is held tightly attached to said sleeve as a result of said sleeve having been expanded thereinto.

6. An ignition squib assembly as defined by claim 4 wherein said collar further includes an external shoulder adjacent said one end thereof.

7. An ignition squib assembly as defined by claim 4 wherein said sleeve further includes at least three substantially straight longitudinal ridges that are substantially equally angularly spaced about the surface thereof, said longitudinal ridges being located at a central region along the length of said sleeve between said collar and the second end of said sleeve.

8. An ignition squib assembly as defined by claim 4 wherein said sleeve is steel plated and said collar is made of stainless steel.

9. An ignition squib assembly comprising, a sleeve having a first end and a second end and including a circular crimp adjacent said first end, the extreme end of said first end of said sleeve being planar, said sleeve being made of a steel plated material, and a collar having a planar inner shoulder adjacent one end thereof, said collar being held in tight embracing relationship with said first end of said sleeve including said crimp with the planar end of said first end of said sleeve in abutting relation with said planar inner shoulder of said collar, said collar having an external shoulder adjacent said one end thereof, said sleeve having igniting materials therein including an electrical squib having electrical terminals that extend outwardly of said sleeve from said first end thereof, said igniting materials being potted in said sleeve with a suitable potting material, said sleeve further including at least three substantially straight longitudinal ridges that are substantially equally angularly spaced about the surface thereof, said longitudinal ridges being located at a central region along the length of said sleeve between said collar and the second end of said sleeve.

* * * * *